(12) United States Patent
Oki et al.

(10) Patent No.: US 11,946,407 B2
(45) Date of Patent: Apr. 2, 2024

(54) CATALYST DEVICE

(71) Applicant: TOYOTA JIDOSHA KABUSHIKI KAISHA, Aichi-ken (JP)

(72) Inventors: Toshinori Oki, Toyota (JP); Tatsuo Iida, Anjo (JP); Takahiro Sadamitsu, Miyoshi (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/193,644

(22) Filed: Mar. 31, 2023

(65) Prior Publication Data

US 2023/0313722 A1 Oct. 5, 2023

(30) Foreign Application Priority Data

Apr. 5, 2022 (JP) ................. 2022-062978

(51) Int. Cl.
*F01N 3/28* (2006.01)
*F01N 3/04* (2006.01)

(52) U.S. Cl.
CPC .......... *F01N 3/2889* (2013.01); *F01N 3/046* (2013.01); *F01N 3/2892* (2013.01)

(58) Field of Classification Search
CPC .... F01N 13/08; F01N 13/143; F01N 13/1805; F01N 13/1866; F01N 13/1888; F01N 2240/16; F01N 2260/20; F01N 2470/24; F01N 3/046; F01N 3/2026; F01N 3/2853; F01N 3/2889; F01N 3/2892
See application file for complete search history.

(56) References Cited

U.S. PATENT DOCUMENTS

| 6,128,821 | A  | * | 10/2000 | Grescher | ............. | F01N 13/1894 |
| | | | | | | 29/446 |
| 6,613,296 | B1 | * | 9/2003 | Myers | ................ | B01D 53/9454 |
| | | | | | | 422/177 |
| 7,238,327 | B2 | * | 7/2007 | Irving | ................ | B01D 53/9454 |
| | | | | | | 422/177 |

(Continued)

FOREIGN PATENT DOCUMENTS

| EP | 2549074 A1 | 1/2013 |
| EP | 2559487 A1 | 2/2013 |

(Continued)

*Primary Examiner* — Jesse S Bogue
(74) *Attorney, Agent, or Firm* — HAUPTMAN HAM, LLP

(57) ABSTRACT

A catalyst device includes a catalyst carrier serving as a heating element that generates heat when energized. The catalyst device includes a guide pipe that guides exhaust into the case. The catalyst device includes a connecting pipe that connects the guide pipe to the case. The case has an end that is an insulative portion and projects further upstream, in the direction in which exhaust flows, from an end surface of the catalyst carrier. A temperature difference inducing structure, which induces a state in which the connecting pipe is relatively lower in temperature than the end of the case, includes a heat shield, encompassing an outer circumferential surface of the connecting pipe and having an opening in part of a portion opposing the outer circumferential surface of the connecting pipe, and a stay fixing the outer circumferential surface of the connecting pipe to an internal combustion engine.

4 Claims, 4 Drawing Sheets

(56) References Cited

U.S. PATENT DOCUMENTS

| | | | |
|---|---|---|---|
| 7,462,332 B2* | 12/2008 | Hardesty | F01N 3/2853 |
| | | | 422/177 |
| 9,759,109 B2* | 9/2017 | Mutsuda | F01N 3/2013 |
| 2005/0036923 A1* | 2/2005 | Brisbin | F01N 3/2853 |
| | | | 422/177 |
| 2008/0060864 A1* | 3/2008 | Arai | F01N 13/14 |
| | | | 60/299 |
| 2013/0011300 A1 | 1/2013 | Yoshioka et al. | |
| 2013/0022513 A1 | 1/2013 | Yoshioka et al. | |
| 2013/0183205 A1* | 7/2013 | Yoshioka | F01N 3/2026 |
| | | | 422/199 |
| 2013/0199869 A1 | 8/2013 | Murakami et al. | |
| 2014/0216019 A1* | 8/2014 | Yoshioka | F01N 3/2864 |
| | | | 60/300 |
| 2022/0088562 A1 | 3/2022 | Oki | |

FOREIGN PATENT DOCUMENTS

| | | |
|---|---|---|
| EP | 3971398 A1 | 3/2022 |
| JP | 2015-102069 A | 6/2015 |
| JP | 2015-137552 A | 7/2015 |
| JP | 2020-12396 A | 1/2020 |

\* cited by examiner

CATALYST DEVICE

RELATED APPLICATIONS

The present application claims priority of Japanese Patent Application No. 2022-062978 filed Apr. 5, 2022, the disclosure of which is hereby incorporated by reference herein in its entirety.

BACKGROUND

1. Field

The following description relates to a catalyst device.

2. Description of Related Art

A known electrically heated catalyst is heated by energizing a heating element. The catalyst is accommodated in a tubular case and coupled to the case in a state electrically insulated from the case. When particulate matter included in the exhaust gas collects on such an electrically heated catalyst, electrical short-circuiting may occur between the catalyst and the case and cause current to flow to the case. Thus, the case needs to be insulative.

To ensure insulation of the case, Japanese Laid-Open Patent Publication No. 2015-137552 discloses a catalyst device including a catalyst and labyrinth structure at the upstream side of the catalyst in the direction in which the exhaust flows.

The catalyst device includes a connecting pipe, which is connected to the end of the case at the upstream side in the exhaust direction, and a guide pipe, which is connected to the end of the connecting pipe at the upstream side in the exhaust direction. The guide pipe is smaller in diameter than the case. The end of the case at the upstream side in the exhaust direction, which projects further upstream from the upstream end of a heating body, is an electrically insulative portion. The portion where the connecting pipe and the case are connected includes a coupling portion where the connecting pipe is coupled to the outer circumferential surface of the case, and a pipe structure in which the connecting pipe at the upstream side of the coupling portion is separated from the case in the radial direction so as to overlap and encompass the end of the case. Further, the ends of the connecting pipe and the case, and an end of the guide pipe form a labyrinth structure.

In such a catalyst device, the insulative portion at the end of the case insulates the case. The particulate matter in the exhaust may collect on the insulative portion at the end of the case. The particulate matter may form a conductive path connecting the end of the case and the connecting pipe thereby adversely affecting the insulation of the case. Thus, the catalyst device includes the labyrinth structure to reduce the particulate matter that collects on the insulative portion at the end of the case.

Nevertheless, particulate matter may collect on the insulative portion at the end of the case even with the catalyst device disclosed in Japanese Laid-Open Patent Publication No. 2015-137552. Thus, the accumulated particulate matter needs to be further reduced to improve insulation at the insulative portion on the end of the case.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a catalyst device is arranged in an exhaust passage of an internal combustion engine mounted on a vehicle. The catalyst device includes a catalyst that purifies exhaust, a heating element that generates heat when energized to heat the catalyst, and a case that includes a pipe accommodating the catalyst and the heating element. Further, the catalyst device includes a connecting pipe, which is connected to an end of the case at an upstream side in a direction in which exhaust flows through the exhaust passage, and a guide pipe, which is connected to an end of the connecting pipe at an upstream side in the exhaust direction and which has a smaller diameter than the case. The end of the case at the upstream side in the exhaust direction is an electrically insulative portion and projects further upstream from an end of the heating element at an upstream side in the exhaust direction. A portion where the connecting pipe and the case are connected includes a coupling portion where the connecting pipe is coupled to an outer circumferential surface of the case, and a pipe structure in which the connecting pipe, at an upstream side of the coupling portion in the exhaust direction, is separated from the case in a radial direction so as to overlap and encompass the end of the case. The catalyst device further includes a temperature difference inducing structure that induces a state in which the connecting pipe is relatively lower in temperature than the end of the case.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A first embodiment of a catalyst device will now be described with reference to FIGS. 1 and 2.

Internal Combustion Engine

Figure 1:
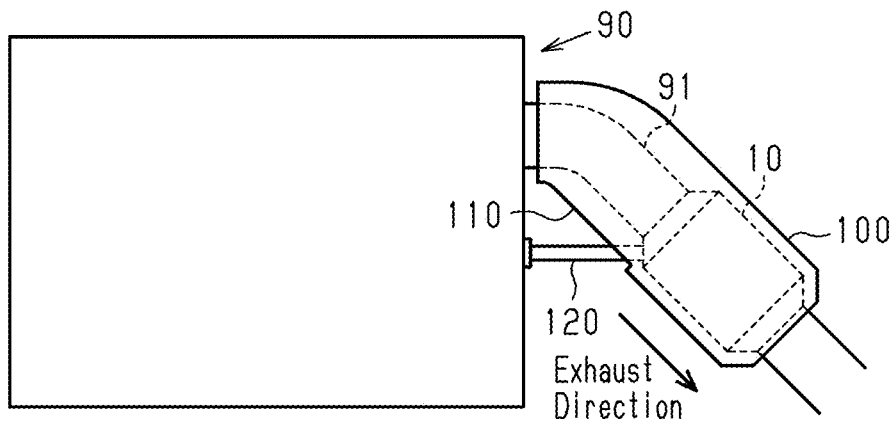
FIG. 1 is a schematic diagram showing an internal combustion engine including one embodiment of a catalyst device.

FIG. 1 shows a catalyst device 10 and an internal combustion engine 90 that uses the catalyst device 10.

One example of the internal combustion engine 90 is a gasoline engine that uses gasoline as fuel. The internal combustion engine 90 may be a diesel engine that uses diesel as fuel.

The internal combustion engine 90 includes an exhaust passage 91 through which the exhaust discharged from combustion chambers flows. The arrow in FIG. 1 shows the direction in which the exhaust discharged from the combustion chambers flows through the exhaust passage 91 out of a discharge port.

The catalyst device 10 is arranged in the exhaust passage 91. The catalyst device 10 is an electrically heated catalyst device including a heating element that is heated when energized.

The outer circumferential surface of the exhaust passage 91 and the outer circumferential surface of the catalyst device 10 are encompassed by a heat shield 100, which is formed by a thin plate of metal such as stainless steel.

Structure of Catalyst Device

Figure 2:
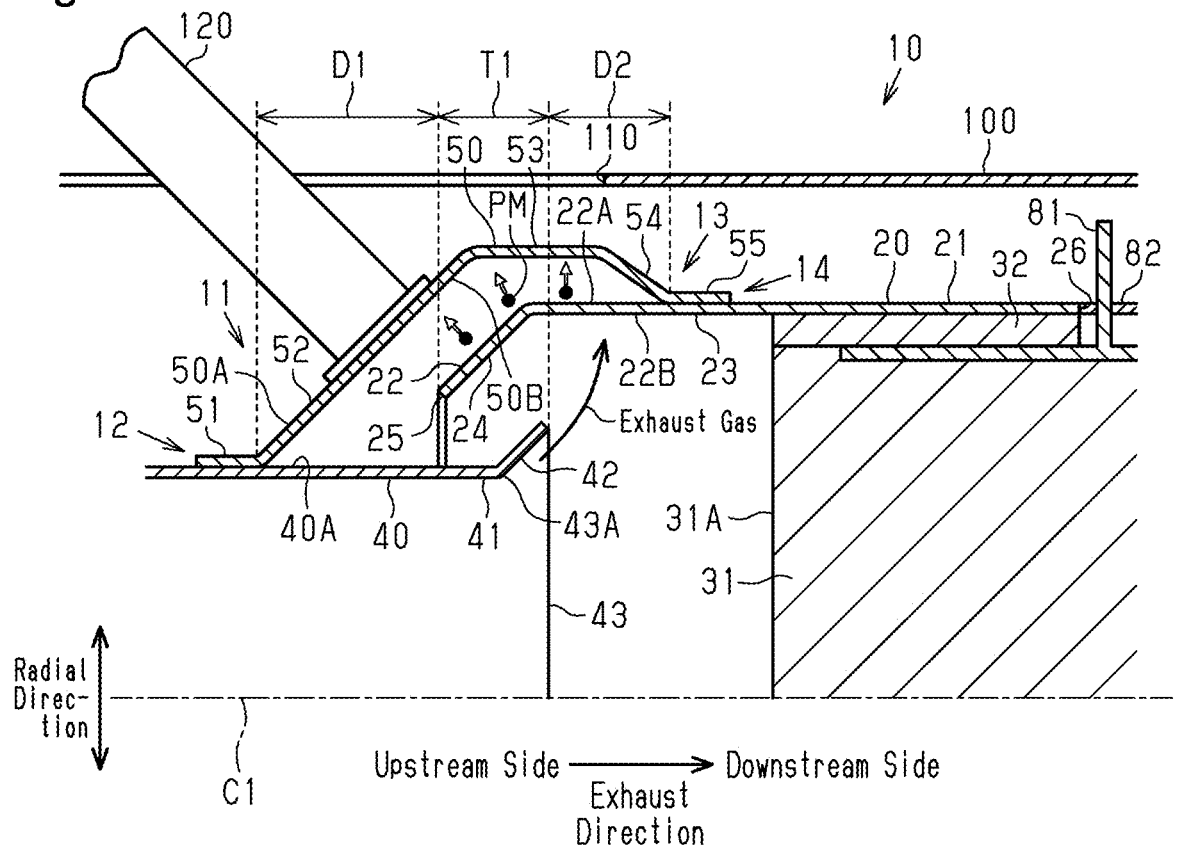
FIG. 2 is a cross-sectional view of the catalyst device.

FIG. 2 shows an axis C1 of the catalyst device 10. The axis C1 coincides with the axis of the exhaust passage 91. The catalyst device 10 is shaped to be linearly symmetrical with respect to the axis C1. The arrow in FIG. 2 also shows the exhaust direction in the same manner as FIG. 1.

As shown in FIG. 2, the catalyst device 10 includes a catalyst carrier 31 carrying a catalyst that purifies exhaust. The catalyst device 10 includes a case 20 that includes a pipe accommodating the catalyst carrier 31. The catalyst device 10 includes a mat 32 that fixes the catalyst carrier 31 in an accommodation compartment 21 of the case 20. The catalyst device 10 includes two electrodes 81 used to energize the catalyst carrier 31. FIG. 2 shows one of the two electrodes 81. The catalyst device 10 includes a guide pipe 40 that guides the exhaust flowing through the exhaust passage 91 into the case 20. The catalyst device 10 includes a connecting pipe 50 that joins the guide pipe 40 and the case 20. The structure at the upstream side of the catalyst device 10 in the exhaust direction will now be described. The structure at the downstream side of the catalyst device in the exhaust direction may be symmetrical to that at the upstream side or have a single-pipe structure formed by the case 20 accommodating the catalyst carrier 31.

The catalyst carrier 31 has the form of a cylindrical column of which the axis is the axis C1. The cross section of the catalyst carrier 31 taken along a plane orthogonal to the axis C1 has a circular profile. The catalyst carrier 31 may have the form of a cylindrical column having a cross section with an oval profile or a polygonal column having a cross section with a polygonal profile.

The catalyst carrier 31 is a porous body. In one example, the catalyst carrier 31 is constructed to have a honeycomb structure including partitioned passages extending in the exhaust direction. One example of the carrier carried by the catalyst carrier 31 is a three-way catalyst. The catalyst may be an oxidation type, a selective catalytic reduction type, or the like.

The electrodes 81 are connected to the catalyst carrier 31. Voltage is applied between the two electrodes 81 so that current flows to the catalyst carrier 31. When current flows through the catalyst carrier 31, the electrical resistance of the catalyst carrier 31 heats the catalyst carrier 31. The catalyst carrier 31, which is formed from a substance that generates heat when energized in accordance with the electrical resistance, corresponds to a heat element that generates heat when energized. One example of the catalyst carrier 31 is a ceramic such as silicon carbide. The heating element may include a member that differs from the catalyst carrier 31. For example, a heating element, to which the electrodes 81 are connected, may be arranged at the upstream side of the catalyst carrier 31 in the exhaust direction.

The mat 32 covers the cylindrical side surface of the catalyst carrier 31. The mat 32 is an insulator having a small electric conductivity. In one example, the mat 32 is formed by inorganic fibers of which the main component is alumina. The mat 32 is held between the catalyst carrier 31 and the case 20. When the mat 32 is wrapped around the catalyst carrier 31, the outer diameters of the catalyst carrier 31 and the mat 32 are greater than the inner diameter of the accommodation compartment 21 in the case 20. Thus, when the mat 32 is accommodated in the accommodation compartment 21, the inner circumferential surface of the accommodation compartment 21 compresses the mat 32. The repulsion of the mat 32 fixes the catalyst carrier 31 in the accommodation compartment 21 of the case 20. Since the mat 32 encompasses the catalyst carrier 31, current does not flow to the case 20 even when the catalyst carrier 31 is energized. The mat 32 only needs to insulate the catalyst carrier 31 from the case 20. Thus, the mat 32 does not necessarily have to cover the entire side surface of the catalyst carrier 31.

The case 20 is a pipe formed from a metal material such as stainless steel. The axis C1 coincides with the axis of the case 20. The case 20 includes the accommodation compartment 21 and an end 22 located at the upstream side of the accommodation compartment 21 in the exhaust direction. The end surface of the catalyst carrier 31, accommodated in the case 20, at the upstream side in the exhaust direction is defined as the catalyst upstream end 31A. The portion of the case 20 at the upstream side of the catalyst upstream end 31A is the end 22, and the portion at the downstream side of the catalyst upstream end 31A is the accommodation compartment 21. The inner diameter of the accommodation compartment 21 is double the distance from the axis C1 to the inner circumferential surface of the accommodation compartment 21. The inner diameter of the accommodation compartment 21 is constant in the direction in which the axis C1 extends from one end to the other end of the accommodation compartment 21. The end 22 of the case 20 projects toward the upstream side in the exhaust direction from the catalyst upstream end 31A. The end 22 of the case 20 has a surface coated by an insulator. The insulator coats the entire surface of the end 22 and forms an insulative layer on the end 22. Thus, the end 22 of the case 20 is an insulative portion.

The accommodation compartment 21 of the case 20 includes electrode insertion holes 26 for insertion of the electrodes 81. The electrodes 81, which are connected to the catalyst carrier 31, project through the electrode insertion holes 26 out of the case 20. The electrode insertion holes 26 are closed by an electrode holder 82. The electrode holder 82 fixes the electrodes 81, which are inserted into the electrode insertion holes 26. The electrode holder 82 is an insulator having a small electric conductivity. The electrode holder 82 supports the electrodes 81 so that current does not flow to the case 20.

The end 22 of the case 20 includes a diameter-decreasing portion 24, which is located at the upstream end of the case 20 in the exhaust direction, and an equal-diameter portion 23, which is located between the diameter-decreasing portion 24 and the accommodation compartment 21 and which connects the diameter-decreasing portion 24 and the accommodation compartment 21. The inner diameter of the equal-diameter portion 23 is double the distance from the axis C1 to the inner circumferential surface of the equal-diameter portion 23. The inner diameter of the equal-diameter portion 23 is constant in the direction in which the axis C1 extends from one end to the other end of the equal-diameter portion 23. The inner diameter of the equal-diameter portion 23 is equal to the inner diameter of the accommodation compartment 21.

In the diameter-decreasing portion 24 at the end 22 of the case 20, the pipe is gradually reduced in diameter so that the distance from the inner circumferential surface of the diameter-decreasing portion 24 to the axis C1 decreases toward the upstream side in the exhaust direction. Thus, the inner diameter of the diameter-decreasing portion 24 decreases toward the upstream side in the exhaust direction. The opening of the case 20 at the upstream side in the exhaust direction is where the inner diameter is the smallest. The opening is defined as an open case end 25 located in the distal end of the diameter-decreasing portion 24 at the upstream side in the exhaust direction.

As shown in FIG. 2, in a cross section taken along the axis of the catalyst device 10, the inner circumferential surface of the diameter-decreasing portion 24 is inclined relative to the axis C1 so that the distance from the inner circumferential surface of the diameter-decreasing portion 24 to the axis C1 decreases toward the upstream side in the exhaust direction. In the same manner, the outer circumferential surface of the diameter-decreasing portion 24 is inclined relative to the axis C1 so that the distance from the outer circumferential surface of the diameter-decreasing portion 24 to the axis C1 decreases toward the upstream side in the exhaust direction. In the cross section shown in FIG. 2, the diameter-decreasing portion 24 may be curved so that the distance from the inner or outer circumferential surface of the diameter-decreasing portion 24 to the axis C1 decreases toward the upstream side in the exhaust direction.

The guide pipe 40 has a smaller diameter than the case 20. The axis C1 coincides with the axis of the guide pipe 40. The guide pipe 40 is formed from a metal material such as stainless steel. The guide pipe 40 is inserted into the case 20 from the open case end 25. More specifically, an end of the guide pipe 40 at the downstream side in the exhaust direction that is defined as a guide end 41 is inserted into the end 22 of the case 20. The axis of the guide pipe 40 coincides with the axis of the case 20.

The guide end 41 of the guide pipe 40 includes a diameter-increasing portion 42. The pipe at the diameter-increasing portion 42 is gradually enlarged in diameter so that the distance from the inner circumferential surface of the diameter-increasing portion 42 to the axis C1 increases toward the downstream side in the exhaust direction. Thus, the inner diameter of the diameter-increasing portion 42 increases toward the downstream side in the exhaust direction. The opening of the guide pipe 40 at the downstream side in the exhaust direction is where the inner diameter is the largest. The opening is defined as a guide outlet 43 located in the distal end of the diameter-increasing portion 42 at the downstream side in the exhaust direction.

As shown in FIG. 2, in the cross section taken along the axis of the catalyst device 10, the inner circumferential surface of the diameter-increasing portion 42 is inclined relative to the axis C1 so that the distance from the inner circumferential surface of the diameter-increasing portion 42 to the axis C1 increases toward the downstream side in the exhaust direction. In the same manner, the outer circumferential surface of the diameter-increasing portion 42 is inclined relative to the axis C1 so that the distance from the outer circumferential surface of the diameter-increasing portion 42 to the axis C1 increases toward the downstream side in the exhaust direction. In the cross section shown in FIG. 2, the diameter-increasing portion 42 may be curved so that the distance from the inner or outer circumferential surface of the diameter-increasing portion 42 to the axis C1 increases toward the downstream side in the exhaust direction.

An outer circumferential surface 40A of the guide pipe 40 is separated in a radial direction of the catalyst device 10 from an inner circumferential surface 22B of the end 22 of the case 20. An open space between the guide pipe 40 and the case 20 allows for the flow of exhaust. The arrows in FIG. 2 show the radial direction of the catalyst device 10. In the description hereafter, the direction receding from the axis C1 may be referred to as the outward direction, and the direction approaching the axis C1 may be referred to as the inward direction.

In the catalyst device 10, the diameter-increasing portion 42 of the guide pipe 40 and the diameter-decreasing portion 24 of the case 20 are arranged in an overlapping manner, with the diameter-decreasing portion 24 separated from the diameter-increasing portion 42 in the outward direction. The diameter-increasing portion 42 includes a proximal end 43A at the side opposite the guide outlet 43. The proximal end 43A is located at the downstream side of the open case end 25 of the case 20 in the exhaust direction. The outer diameter of the diameter-increasing portion 42 at the location where the outer diameter is the largest is smaller than the inner diameter of the diameter-decreasing portion 24 at the location where the inner diameter is the smallest.

In the catalyst device 10, the outer circumferential surface of the diameter-increasing portion 42 is parallel to the inner circumferential surface of the diameter-decreasing portion 24 in the cross section taken along the axis of the catalyst device 10 shown in FIG. 2. As long as the diameter-increasing portion 42 is separated in the radial direction from the diameter-decreasing portion 24, the outer circumferential surface of the diameter-increasing portion 42 does not necessarily have to be parallel to the inner circumferential surface of the diameter-decreasing portion 24. Thus, the inclined angle of the outer circumferential surface of the diameter-increasing portion 42 can be changed relative to the axis C1. Further, the inclined angle of the inner circumferential surface of the diameter-decreasing portion 24 can be changed relative to the axis C1.

The connecting pipe 50 encompasses the end 22 of the case 20 and the guide end 41 of the guide pipe 40. The axis C1 coincides with the axis of the connecting pipe 50. The connecting pipe 50 has an upstream end 51, at the upstream side in the exhaust direction, coupled to the outer circumferential surface 40A of the guide pipe 40. In the catalyst device 10, the portion where the upstream end 51 of the connecting pipe 50 is coupled to the guide pipe 40 is referred to as the first coupling portion 12. The connecting pipe 50 has a downstream end 55, at the downstream side in the exhaust direction, coupled to an outer circumferential surface 22A of the case 20 at the end 22. In the catalyst device 10, the portion where the downstream end 55 of the connecting pipe 50 is coupled to the case 20 is referred to as the second coupling portion 14. The connecting pipe 50, coupled to the guide pipe 40 and the case 20, closes the open space between the guide pipe 40 and the case 20.

The connecting pipe 50 is formed from a metal material such as stainless steel. The connecting pipe 50 may be separated into a segment including the upstream end 51 that is coupled to the guide pipe 40 and a segment including the downstream end 55 that is coupled to the case 20. In this case, the two segments are coupled so that the connecting pipe 50 connects the guide pipe 40 and the case 20. Further, the connecting pipe 50 may be wound in the circumferential direction around the end 22 of the case 20 and the guide end 41 of the guide pipe 40, with one end of the connecting pipe 50 overlapped with and coupled to the other end so to connect the guide pipe 40 and the case 20.

The connecting pipe 50 includes an inclined portion 52 where the distance from the inner circumferential surface of the connecting pipe 50 to the axis C1 increases from the upstream end 51 toward the downstream side in the exhaust direction. The inner circumferential surface of the inclined portion 52 is separated from the outer circumferential surface of the guide pipe 40 in the radial direction. The inner circumferential surface of the inclined portion 52 is arranged at a position located outward from the outer circumferential surface of the guide pipe 40. An open space between the inclined portion 52 and the guide pipe 40 allows for the flow of exhaust. The inclined portion 52 is arranged at a position located outward from the case 20 in a plane lying along the open case end 25.

The connecting pipe 50 includes a terminal end 54 where the distance from the inner circumferential surface of the connecting pipe 50 to the axis C1 increases from the downstream end 55 toward the upstream side in the exhaust direction. The inner circumferential surface of the terminal end 54 is separated from the outer circumferential surface of the case 20. The inner circumferential surface of the terminal end 54 is arranged at a position located outward from the outer circumferential surface of the case 20. An open space between the terminal end 54 and the case 20 allows for the flow of exhaust.

The connecting pipe 50 includes an intermediate portion 53 located between the inclined portion 52 and the terminal end 54. The intermediate portion 53 connects the inclined portion 52 and the terminal end 54. The inner diameter of the intermediate portion 53 is constant in the direction in which the axis C1 extends from one end to the other end of the intermediate portion 53. The inner circumferential surface of the intermediate portion 53 is separated from the outer circumferential surface of the case 20 in the radial direction. The inner circumferential surface of the intermediate portion 53 is arranged at a position located outward from the outer circumferential surface of the case 20. An open space between the intermediate portion 53 and the case 20 allows for the flow of exhaust.

The border of the inclined portion 52 and the intermediate portion 53 in the connecting pipe 50 may be located at the downstream side of the open case end 25 in the exhaust direction. Instead, the border of the inclined portion 52 and the intermediate portion 53 may lie on a plane extending along the open case end 25 or be located at the upstream side of the open case end 25 in the exhaust direction.

The border of the intermediate portion 53 and the terminal end 54 in the connecting pipe 50 may be located at the downstream side of the guide outlet 43 in the exhaust direction. Instead, the border of the intermediate portion 53 and the terminal end 54 may lie on a plane extending along the guide outlet 43 or be located at the upstream side of the guide outlet 43 in the exhaust direction.

As shown in FIG. 2, in the cross section taken along the axis of the catalyst device 10, the inner circumferential surface of the inclined portion 52 is inclined relative to the axis C1 so that the distance from the inner circumferential surface of the inclined portion 52 to the axis C1 increases toward the downstream side in the exhaust direction. The inner circumferential surface of the terminal end 54 is inclined relative to the axis C1 so that the distance from the inner circumferential surface of the terminal end 54 to the axis C1 increases toward the upstream side in the exhaust direction. The inner circumferential surface of the intermediate portion 53 is parallel to the axis C1.

In the catalyst device 10, the portion of the connecting pipe 50 near the upstream end 51 overlaps and encompasses the guide pipe 40. This forms a double-pipe structure D1 where two pipes overlap. The double-pipe structure D1 is formed over a range extending from the first coupling portion 12 to the open case end 25. The first coupling portion 12 and the double-pipe structure D1 define a first connecting portion 11, which is where the guide pipe 40 and the connecting pipe 50 are connected.

In the catalyst device 10, the portion of the connecting pipe 50 near the downstream end 55 overlaps and encompasses the case 20. This forms a double-pipe structure D2 where two pipes overlap. The double-pipe structure D2 is formed over a range extending from the second coupling portion 14 to the guide outlet 43. The second coupling portion 14 and the double-pipe structure D2 define a second connecting portion 13, which is where the case 20 and the connecting pipe 50 are connected.

Further, in the catalyst device 10, the portion of the connecting pipe 50 overlaps and encompasses the guide end 41 and the end 22 of the case 20. This forms a triple-pipe structure T1. The triple-pipe structure T1 is located between the first connecting portion 11 and the second connecting portion 13.

In the triple-pipe structure T1, the case 20 and the connecting pipe 50 are sequentially arranged one over the other outward from the guide pipe 40. In the triple-pipe structure T1, the open space between the guide pipe 40 and the case 20, at the downstream side in the exhaust direction, is connected with the inside of the case 20. In the triple-pipe structure T1, the open space between the guide pipe 40 and the case 20, at the upstream side in the exhaust direction, is connected with the open space in the double-pipe structure D1 between the connecting pipe 50 and the guide pipe 40. In the triple-pipe structure T1, the open space between the case 20 and the connecting pipe 50, at the upstream side in the exhaust direction, is connected with the open space in the double-pipe structure D1 between the connecting pipe 50 and the guide pipe 40. In the triple-pipe structure T1, the open space between the case 20 and the connecting pipe 50, at the downstream side in the exhaust direction, is connected with the open space in the double-pipe structure D2 between the connecting pipe 50 and the case 20.

The catalyst device 10 includes the double-pipe structure D1, the double-pipe structure D2, and the triple-pipe structure T1 at the upstream side of the catalyst carrier 31 in the exhaust direction. The double-pipe structure D1, the double-pipe structure D2, and the triple-pipe structure T1 form a labyrinth structure.

Temperature Difference Inducing Structure

The catalyst device 10 includes a temperature difference inducing structure that induces a state in which the connecting pipe 50 is relatively lower in temperature than the end 22 of the case 20. The temperature inducing structure of the catalyst device 10 includes a stay 120, the heat shield 100, and the diameter-increasing portion 42 of the guide pipe 40. The stay 120 connects an outer circumferential surface 50A of the connecting pipe 50 and the internal combustion engine 90, which is a structure. The heat shield 100 encompasses the outer circumferential surface 50A of the connecting pipe 50.

The stay 120 is formed from a metal material such as stainless steel. One end of the stay 120 is fixed to the outer circumferential surface of the inclined portion 52 of the connecting pipe 50. The other end of the stay 120 is fixed to the outer wall of the internal combustion engine 90. One end of the stay 120 may be connected to the intermediate portion 53 or the terminal end 54 of the connecting pipe 50.

The heat shield 100 encompasses the outer circumferential surface 50A of the connecting pipe 50 and has an opening 110 in part of a portion opposing the outer circumferential surface 50A of the connecting pipe 50. The opening 110 is cut away from the heat shield 100 and extends from the part opposing the outer circumferential surface 50A of the connecting pipe 50 to an end at the upstream side in the exhaust direction.

Operation

The operation of the present embodiment will now be described.

With reference to FIG. 2, the flow of exhaust from the guide pipe 40 into the case 20 will now be described.

In the catalyst device 10, some of the exhaust flowing from the guide pipe 40 toward the case 20 flows along the diameter-increasing portion 42 of the guide pipe 40. The exhaust flowing along the diameter-increasing portion 42 flows toward the inner circumferential surface 22B at the end 22 of the case 20. This raises the temperature of the case 20 at the end 22.

Further, some of the exhaust flowing from the guide pipe 40 into the case 20 strikes the catalyst upstream end 31A of the catalyst carrier 31 and changes direction. The exhaust that strikes the catalyst upstream end 31A and flows in the outward direction reverses direction as it flows along the inner circumferential surface 22B at the end 22 of the case 20 toward the upstream side in the exhaust direction.

In the catalyst device 10, the diameter-decreasing portion 24 of the case 20 is arranged at the upstream side of the catalyst upstream end 31A. Thus, the exhaust that strikes the catalyst upstream end 31A and reverses direction may hit the diameter-decreasing portion 24. Further, the diameter-increasing portion 42 of the guide pipe 40 is also arranged at the upstream side of the catalyst upstream end 31A. Thus, the exhaust that strikes the catalyst upstream end 31A and reverses direction may also hit the diameter-increasing portion 42. Since the exhaust strikes the diameter-decreasing portion 24 or the diameter-increasing portion 42, the reversed flow of exhaust is limited.

Further, when the vehicle travels, air current flows through the opening 110 of the heat shield 100 and strikes the connecting pipe 50. This lowers the temperature of the connecting pipe 50.

Additionally, the stay 120 is connected to the outer circumferential surface 50A of the connecting pipe 50. Thus, the connecting pipe 50 has a greater heat capacity than when there is no stay 120.

Advantages

The advantages of the present embodiment will now be described.

(1) With the catalyst device 10, as long as the exhaust that strikes the catalyst upstream end 31A does not repetitively reverse the direction in which it flows, exhaust will not reach the portion between the case 20 and the connecting pipe 50 in the double-pipe structure D2 of the second connecting portion 13. This limits the exhaust that reaches the portion between the case 20 and the connecting pipe 50 at the second connecting portion 13. Thus, PM is less likely to collect in the portion between the case 20 and the connecting pipe 50. This reduces the PM accumulated on the outer circumferential surface 22A of the case 20 at the end 22.

Since PM is less likely to collect on the insulative layer applied to the end 22, the formation of an electric path on the end 22 can be avoided. This avoids short-circuiting between the catalyst carrier 31, which is a heating element, and the case 20.

(2) When the connecting pipe 50 becomes relatively lower in temperature than the end 22 of the case 20, the PM collected on the outer circumferential surface 22A of the case 20 at the end 22 is moved, as a result of thermophoresis, toward an inner circumferential surface 50B of the connecting pipe 50. This reduces the PM accumulated on the end 22, which is the insulative portion. The reduction of the PM accumulated on the insulative portion improves the insulation performance of the insulative portion.

The catalyst device 10 includes the temperature difference inducing structure that induces a state in which the connecting pipe 50 is relatively lower in temperature than the end 22 of the case 20. A state in which the connecting pipe 50 is relatively lower in temperature than the end 22 of the case 20 would not be induced without the temperature difference inducing structure. That is, the temperature difference inducing structure improves the insulation performance of the insulative portion at the end 22 of the case 20.

(3) The temperature difference inducing structure of the catalyst device 10 includes the heat shield 100 that encompasses the outer circumferential surface 50A of the connecting pipe 50 and has the opening 110 in part of a portion opposing the outer circumferential surface 50A of the connecting pipe 50. Thus, air current flows through the opening 110 and strikes the connecting pipe 50 and lowers the temperature of the connecting pipe 50. This induces a state in which the connecting pipe 50 is relatively lower in temperature than the end 22 of the case 20.

(4) The temperature difference inducing structure of catalyst device 10 includes the stay 120 that connects the internal combustion engine 90, which is a structure that differs from the catalyst device 10, and the outer circumferential surface 50A of the connecting pipe 50. In this manner, the stay 120, which is connected to the outer circumferential surface 50A of the connecting pipe 50, increases the heat capacity of the connecting pipe 50. An increase in the heat capacity of the connecting pipe 50 will limit increases in the temperature of the connecting pipe 50. This induces a state in which the connecting pipe 50 is relatively lower in temperature than the end 22 of the case 20.

(5) In the temperature difference inducing structure, the guide end 41 of the guide pipe 40 is arranged inside the case 20. Further, the case 20 and the guide pipe 40 are separated in the radial direction. The end 22 of the case 20 overlaps and encompasses the guide end 41 of the guide pipe 40. In addition, the guide pipe 40 includes the diameter-increasing portion 42 that increases the guide end 41 in diameter toward the downstream side in the exhaust direction. As a result, exhaust flows along the diameter-increasing portion 42 toward the inner circumferential surface 22B at the end 22 of the case 20 and raises the temperature of the case 20 at the end 22. This also induces a state in which the connecting pipe 50 is relatively lower in temperature than the end 22 of the case 20.

(6) A longer electrically insulative portion between the catalyst carrier 31 and the case 20 in the direction in which the axis C1 extends will limit the formation of a conductive path caused by accumulated PM. The insulative portion, however, is part of the case 20 and will increase the entire length of the catalyst device 10 when increased in length.

In this respect, the catalyst device 10 includes the temperature difference inducing structure. This improves the insulation performance at the end 22 of the case 20. Thus, the insulation performance of the insulative portion can be improved without increasing the entire length of the catalyst device 10.

Second Embodiment

A second embodiment of the catalyst device will now be described with reference to FIG. 3.

The catalyst device 10 of the present embodiment includes a temperature difference inducing structure differing from that of the first embodiment. The temperature difference inducing structure in the catalyst device 10 of the present embodiment will now be described.

Figure 3:
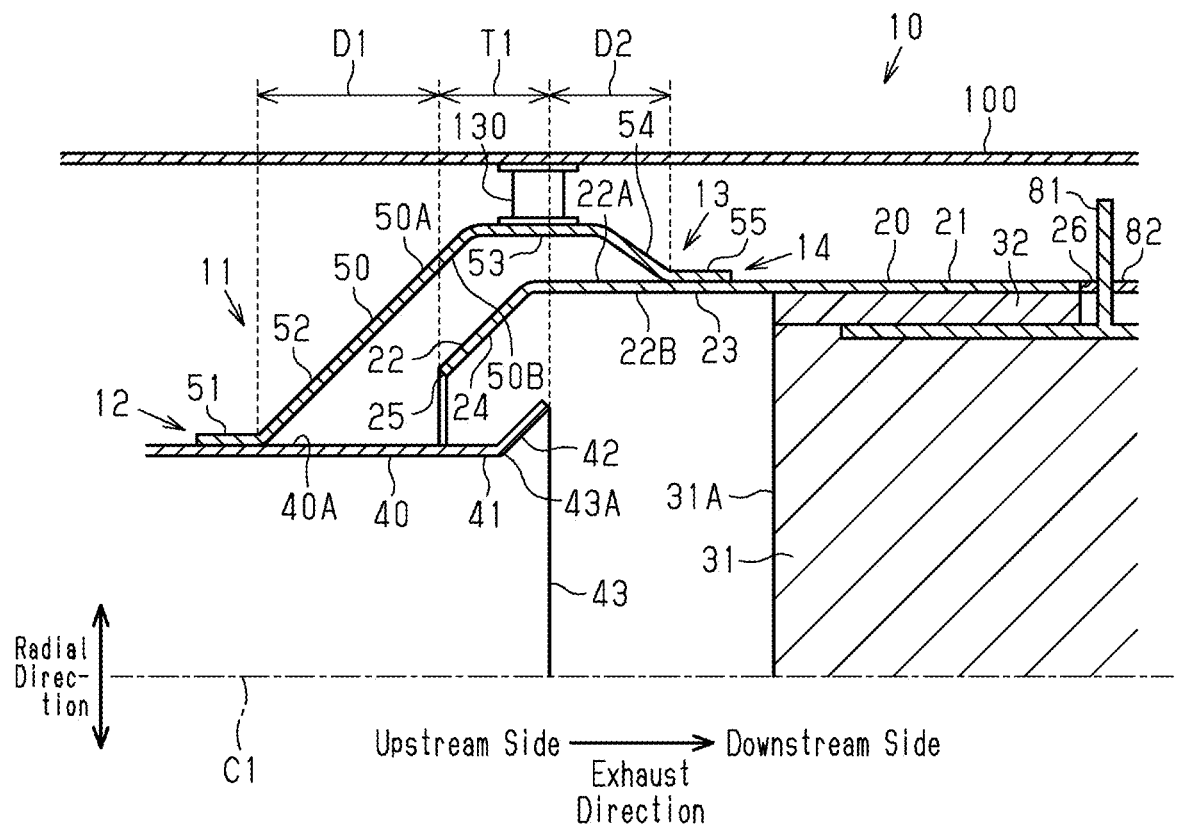
FIG. 3 is a cross-sectional view showing a modified example of the catalyst device.

As shown in FIG. 3, the catalyst device 10 of the present embodiment also includes the heat shield 100 described above. A stay 130 fixes the heat shield 100 to the outer circumferential surface 50A of the connecting pipe 50.

The stay 130 is formed from a metal material such as stainless steel. One end of the stay 130 is fixed to the outer circumferential surface of the intermediate portion 53 of the connecting pipe 50. The other end of the stay 120 is fixed to the heat shield 100. One end of the stay 130 may be connected to the inclined portion 52 or the terminal end 54 of the connecting pipe 50. The stay 130 is one of a plurality of stays arranged in the circumferential direction on the outer circumferential surface 50A of the connecting pipe 50.

The operation and advantage of the temperature difference inducing structure in the present embodiment will now be described.

In the present embodiment, heat is transferred from the connecting pipe 50 via the stay 130 to the heat shield 100 to lower the temperature of the connecting pipe 50. This induces a state in which the connecting pipe 50 is relatively lower in temperature than the end 22 of the case 20.

Third Embodiment

A third embodiment of a catalyst device will now be described with reference to FIGS. 4 and 5.

The catalyst device 10 of the present embodiment includes a temperature difference inducing structure differing from that of the first embodiment. The temperature difference inducing structure in the catalyst device 10 of the present embodiment will now be described.

Figure 4:
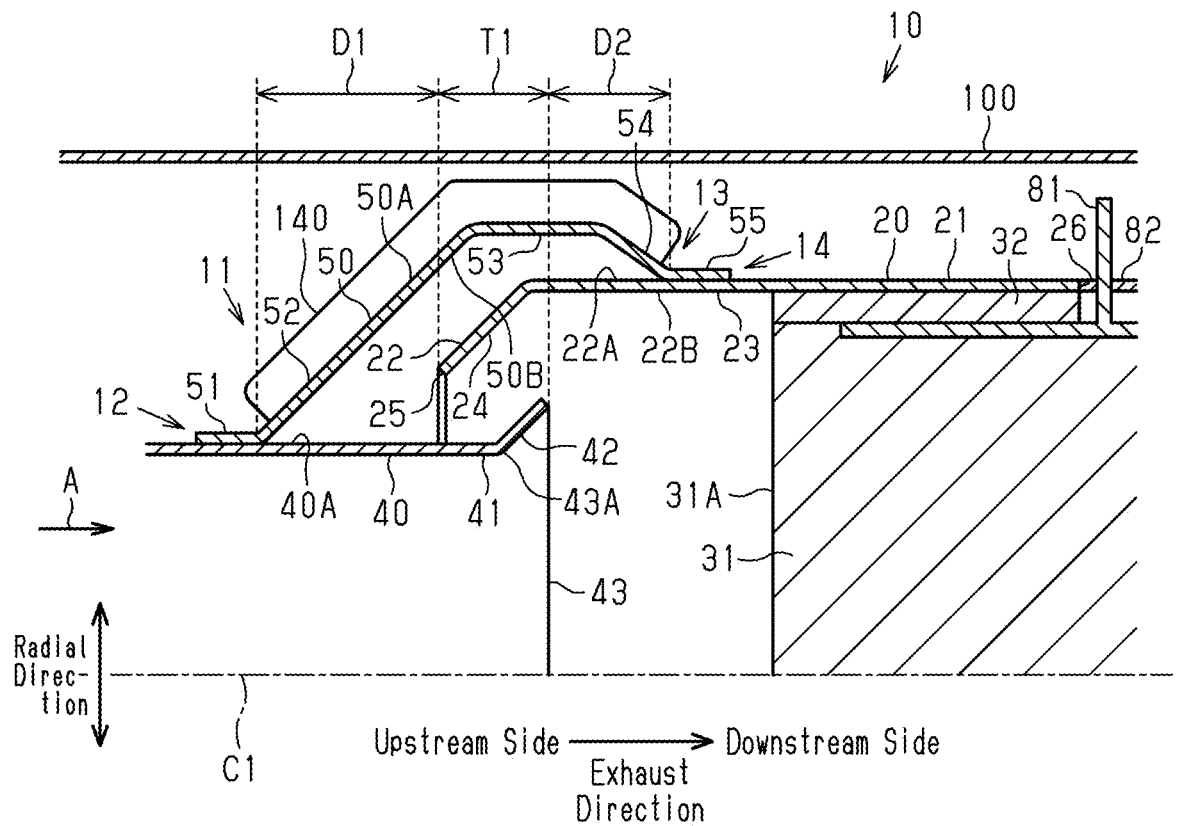
FIG. 4 is a cross-sectional view showing another modified example of the catalyst device.

As shown in FIG. 4, the catalyst device 10 of the present embodiment includes fins 140 on the outer circumferential surface 50A of the connecting pipe 50.

The fins 140 are plates formed from a metal material such as stainless steel. The fins 140 extend from the inclined portion 52 to the terminal end 54 on the connecting pipe 50.

Figure 5:
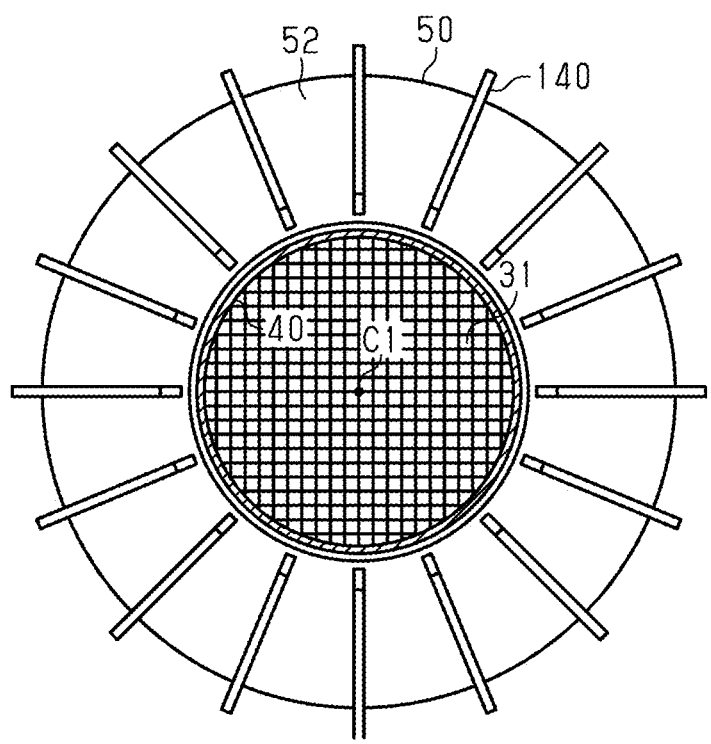
FIG. 5 is a diagram showing the structure of the catalyst device as viewed in the direction of arrow A indicated in FIG. 4.

As shown in FIG. 5, the fins 140 are arranged at equal internal in the circumferential direction on the outer circumferential surface 50A of the connecting pipe 50. There is no limit to the number of the fins 140.

The operation and advantage of the temperature difference inducing structure in the present embodiment will now be described.

In the present embodiment, heat is transferred from the connecting pipe 50 via the fins 140 to the ambient air in order to lower the temperature of the connecting pipe 50. This induces a state in which the connecting pipe 50 is relatively lower in temperature than the end 22 of the case 20.

Fourth Embodiment

A fourth embodiment of the catalyst device will now be described with reference to FIG. 6.

The catalyst device 10 of the present embodiment includes a temperature difference inducing structure differing from that of the first embodiment. The temperature difference inducing structure in the catalyst device 10 of the present embodiment will now be described.

Figure 6:
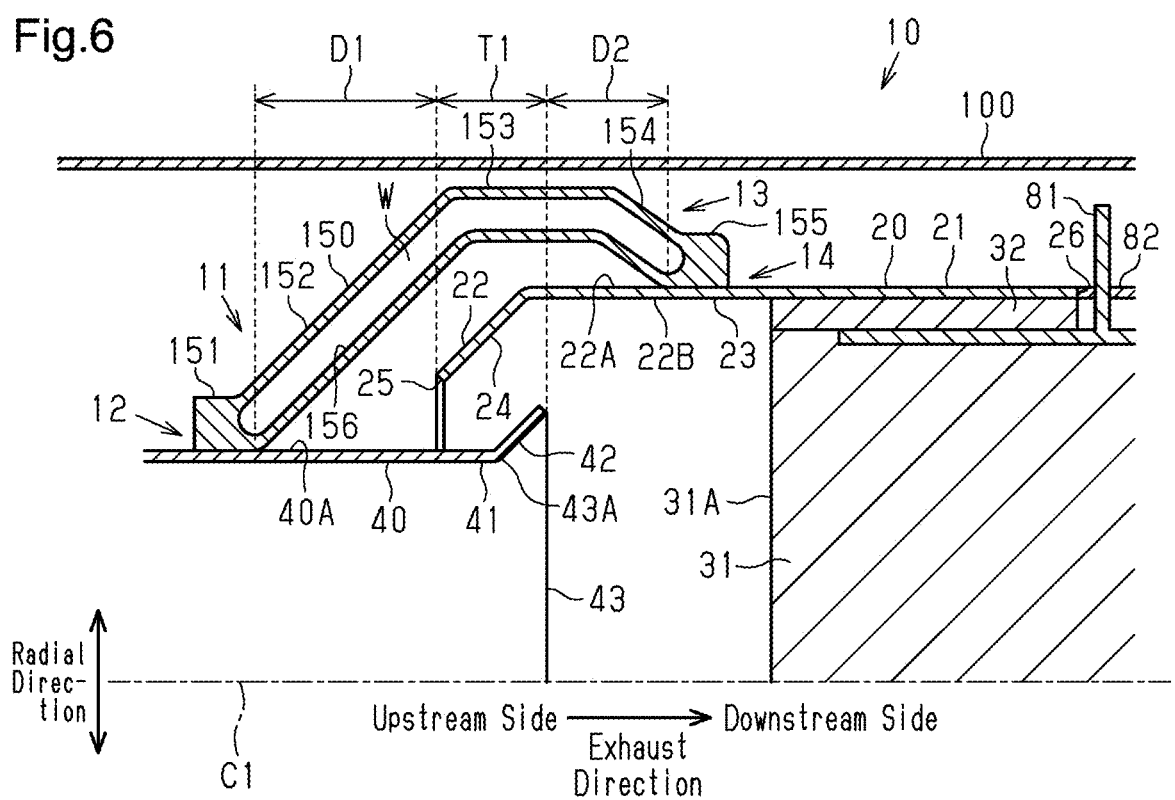
FIG. 6 is a cross-sectional view showing another modified example of the catalyst device.

As shown in FIG. 6, the catalyst device 10 of the present embodiment includes a connecting pipe 150 differing from that of the connecting pipe 50 described above in that the connecting pipe is formed by a casting of a metal material such as cast iron or aluminum alloy. The connecting pipe 150 includes an upstream end 151, an inclined portion 152, an intermediate portion 153, a terminal end 154, and a downstream end 155 that respectively correspond to the upstream end 51, the inclined portion 52, the intermediate portion 53, the terminal end 54, and the downstream end 55, which are described above. A water jacket 156 is formed inside the connecting pipe 150 extending in the circumferential direction. Coolant W from the internal combustion engine 90 flows through the water jacket 156. The water jacket 156 in the connecting pipe 150 extends from the inclined portion 152 to the terminal end 154.

The operation and advantage of the temperature difference inducing structure in the present embodiment will now be described.

The connecting pipe 150 of the present embodiment is formed by a casting. Thus, the connecting pipe 150 has a larger volume than when formed from sheet metal. This increases the heat capacity of the connecting pipe 150. An increase in the heat capacity of the connecting pipe will limit increases in the temperature of the connecting pipe. In contrast, the temperature at the end 22 of the case 20, which is exposed to exhaust, easily rises. In this manner, the temperature will easily rise at the end 22 of the case 20 but not at the connecting pipe 150. This induces a state in which the connecting pipe 150 is relatively lower in temperature than the end 22 of the case 20.

Further, the water jacket 156 formed in the connecting pipe 150 will cool the connecting pipe 150 with the coolant W and lower the temperature. This further induces a state in which the connecting pipe 150 is relatively lower in temperature than the end 22 of the case 20.

Modified Examples

The above embodiments may be modified as described below. The above-described embodiment and the modified examples described below may be combined as long as there is no technical contradiction.

The opening 110 described in the first embodiment does not have to be cut out and may be a hole that opens in only a portion facing the outer circumferential surface 50A of the connecting pipe 50.

The stay 120 described in the first embodiment may be fixed to a structure other than the internal combustion engine 90, such as a vehicle transmission.

In the first embodiment, the stay 120, which is fixed to the outer circumferential surface 50A of the connecting pipe 50, may be omitted. This will obtain the advantages described above except for advantage (4).

The opening 110 described in the first embodiment may be one of a plurality of openings 110 arranged in the circumferential direction of the heat shield 100. The openings 110 will increase the amount of air striking the connecting pipe 50 and further decrease the temperature of the connecting pipe 50. This will further improve the effect of advantage (3).

The first embodiment exemplifies the guide pipe 40 that includes the diameter-increasing portion 42. The guide pipe does not have to include the diameter-increasing portion. For example, a guide pipe having a diameter that is constant in the direction in which the axis C1 extends may be used. This will obtain the advantages described above except for advantage (5).

In the second embodiment, there may be only one stay 130 in the circumferential direction of the outer circumferential surface 50A of the connecting pipe 50. In this case, for example, the stay 130 is fixed to the outer circumferential surface 50A of the connecting pipe 50 to efficiently lower the temperature of the connecting pipe 50.

The fins 140 described in the third embodiment may be arranged on the part of the connecting pipe 50 from the inclined portion 52 to the terminal end 54.

The fins 140 described in the third embodiment may be arranged in a manner concentrated where the temperature becomes the highest on the outer circumferential surface 50A of the connecting pipe 50. This efficiently lowers the temperature of the connecting pipe 50.

The water jacket 156 described in the fourth embodiment may be arranged in the connecting pipe 150 at any part between the inclined portion 152 and the terminal end 154. In this case, for example, the water jacket 156 is formed in the part where the temperature becomes the highest at the outer circumferential surface of the connecting pipe 150. This efficiently lowers the temperature of the connecting pipe 150.

The coolant flowing through the water jacket 156 does not have to be the coolant of the internal combustion engine 90.

In the fourth embodiment, the water jacket 156 may be omitted. This also has the same advantages as when the connecting pipe 150 is formed by a casting.

The temperature difference inducing structures described in the first to fourth embodiments may be implemented in combination.

The heat shield 100 may encompass only the catalyst device 10.

The first embodiment exemplifies the case 20 that includes the diameter-decreasing portion 24. The case 20 does not have to include a diameter-decreasing portion. For example, the inner diameter of the case 20 may be constant from one end to the other end in the direction in which the axis of the catalyst device extends.

The first embodiment exemplifies the case 20 that includes the equal-diameter portion 23. The case 20 does not have to include an equal-diameter portion. More specifically, the end 22 of the case 20 does not have to be an equal-diameter portion and may gradually be decreased in diameter so that the distance from the inner circumferential surface of the case 20 to the axis of catalyst device decreases toward the upstream side in the exhaust direction.

In the first embodiment, the edge at the end 22 of the case 20 is located in the triple-pipe structure T1. The edge of the case, however, does not have to be located in the triple-pipe structure as long as the guide pipe, the case, and the connecting pipe form a triple-pipe structure. The end of the case may be bent so that the edge is directed into the case.

In the first embodiment, the guide pipe 40 is arranged in the case 20 so that the guide outlet 43 of the guide pipe 40 is located at the upstream side of the second coupling portion 14. Instead, the guide outlet 43 may be located at the downstream side of the second coupling portion 14. The guide outlet 43 and the second coupling portion 14 may be located on a plane orthogonal to the axis C1. In such a case, the double-pipe structure is formed in a range from the first coupling portion 12 to the open case end 25. Further, the triple-pipe structure is formed in a range from the open case end 25 to the second coupling portion 14. In the same manner as the above embodiments, such a configuration has the advantage in that it will limit the exhaust reaching the space between the case 20 and the connecting pipe 50 in the second connecting portion 13.

The first embodiment exemplifies the case 20 that is formed from a metal material. The case 20, however, may be formed by an insulator. When the case is an insulator, the end 22 of the case 20 does not have to be coated by an insulative layer The first embodiment exemplifies the connecting pipe 50 that connects the inclined portion 52 and the terminal end 54 with the intermediate portion 53. The intermediate portion 53 may be omitted from the connecting pipe, in which case the inclined portion 52 is connected to the terminal end 54.

Figure 7:
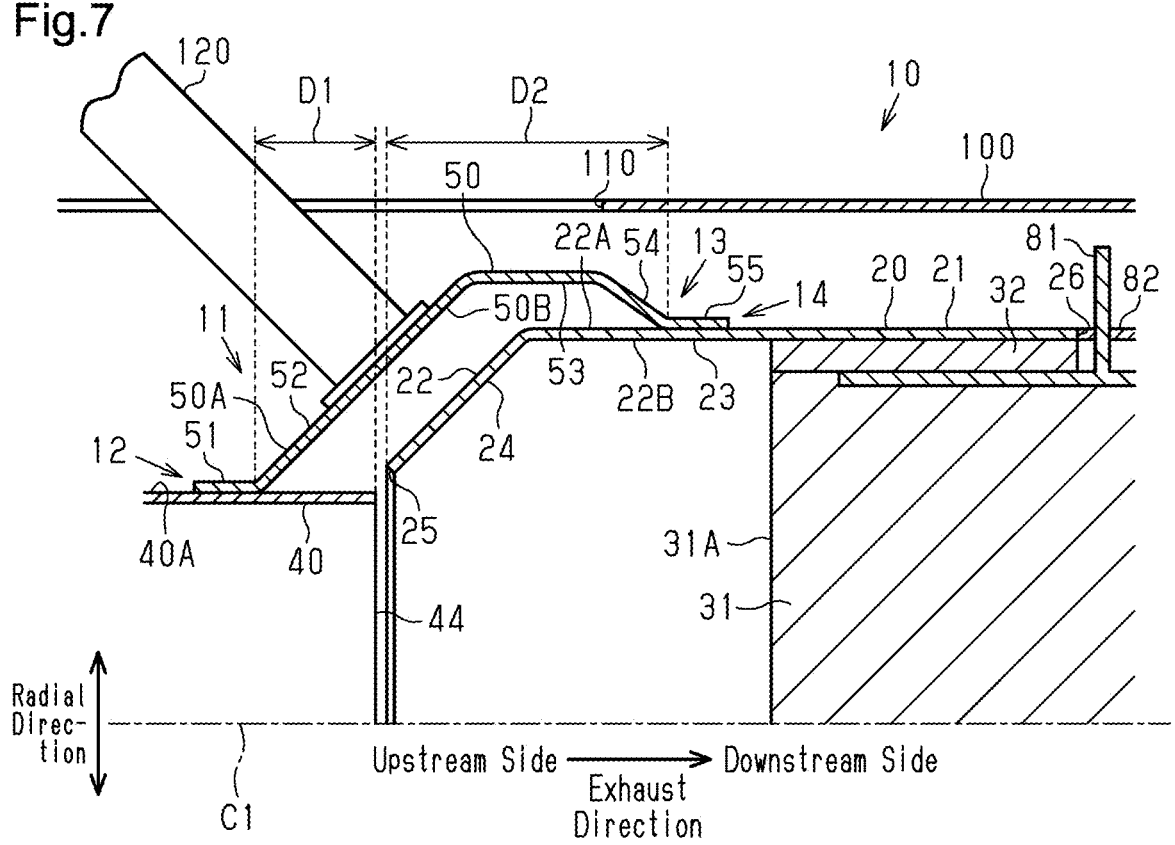
FIG. 7 is a cross-sectional view showing a further modified example of the catalyst device.

The catalyst device 10 described in the first embodiment does not necessarily have to include a triple-pipe structure. FIG. 7 shows a modified example of such a case.

In the modified example of FIG. 7, the diameter-increasing portion 42 is omitted from the guide pipe 40. The diameter-increasing portion 42 does not necessarily have to be omitted. The guide pipe 40 includes an open upstream end, or guide pipe opening 44, that is located at the upstream side of the open case end 25 of the case 20 in the exhaust direction. Such a catalyst device 10 includes the double-pipe structures D1 and D2 but not the triple-pipe structure T1. Even if a triple-pipe structure is not included, the catalyst device 10 will have the advantages described above as long as it includes the temperature difference inducing structure described above.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A catalyst device arranged in an exhaust passage of an internal combustion engine mounted on a vehicle, the catalyst device comprising:
   a catalyst that purifies exhaust;
   a heating element that generates heat when energized to heat the catalyst;
   a case that includes a pipe accommodating the catalyst and the heating element;
   a connecting pipe connected to an end of the case at an upstream side in a direction in which exhaust flows through the exhaust passage; and
   a guide pipe connected to an end of the connecting pipe at an upstream side in the exhaust direction and having a smaller diameter than the case, wherein:
   the end of the case at the upstream side in the exhaust direction is an electrically insulative portion and projects further upstream from an end of the heating element at an upstream side in the exhaust direction,
   a portion where the connecting pipe and the case are connected includes a coupling portion where the connecting pipe is coupled to an outer circumferential surface of the case, and a pipe structure in which the connecting pipe, at an upstream side of the coupling portion in the exhaust direction, is separated from the case in a radial direction so as to overlap and encompass the end of the case,
   the catalyst device further comprises a temperature difference inducing structure that induces a state in which the connecting pipe is relatively lower in temperature than the end of the case, and
   the temperature difference inducing structure includes a heat shield encompassing an outer circumferential surface of the connecting pipe and having an opening in part of a portion opposing the outer circumferential surface of the connecting pipe.

2. The catalyst device according to claim 1, wherein the temperature difference inducing structure includes a stay connecting the outer circumferential surface of the connecting pipe to a structure that differs from the catalyst device.

3. The catalyst device according to claim 1, wherein
   an end of the guide pipe is arranged inside the case;
   the case and the guide pipe are separated in a radial direction;
   the end of the case overlaps and encompasses the end of the guide pipe; and
   the guide pipe includes a diameter-increasing portion that increases the end of the guide pipe in diameter toward a downstream side in the exhaust direction.

4. A catalyst device arranged in an exhaust passage of an internal combustion engine mounted on a vehicle, the catalyst device comprising:
   a catalyst that purifies exhaust;
   a heating element that generates heat when energized to heat the catalyst;
   a case that includes a pipe accommodating the catalyst and the heating element;
   a connecting pipe connected to an end of the case at an upstream side in a direction in which exhaust flows through the exhaust passage; and
   a guide pipe connected to an end of the connecting pipe at an upstream side in the exhaust direction and having a smaller diameter than the case, wherein:
   the end of the case at the upstream side in the exhaust direction is an electrically insulative portion and projects further upstream from an end of the heating element at an upstream side in the exhaust direction,
   a portion where the connecting pipe and the case are connected includes a coupling portion where the connecting pipe is coupled to an outer circumferential surface of the case, and a pipe structure in which the connecting pipe, at an upstream side of the coupling portion in the exhaust direction, is separated from the case in a radial direction so as to overlap and encompass the end of the case,
   the catalyst device further comprises a temperature difference inducing structure that induces a state in which the connecting pipe is relatively lower in temperature than the end of the case, and
   the temperature difference inducing structure includes a stay connecting an outer circumferential surface of the connecting pipe to a structure that differs from the catalyst device.

* * * * *